US012424904B2

(12) United States Patent
Lemmers, Jr.

(10) Patent No.: US 12,424,904 B2
(45) Date of Patent: Sep. 23, 2025

(54) GENERATOR WITH MOISTURE SEALS

(71) Applicant: Hamilton Sundstrand Corporation, Charlotte, NC (US)

(72) Inventor: Glenn C. Lemmers, Jr., Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 228 days.

(21) Appl. No.: 18/165,606

(22) Filed: Feb. 7, 2023

(65) Prior Publication Data

US 2024/0266916 A1    Aug. 8, 2024

(51) Int. Cl.
*H02K 7/18* (2006.01)
*F01D 15/10* (2006.01)
*F01D 25/30* (2006.01)
*H02K 5/22* (2006.01)

(52) U.S. Cl.
CPC ........... *H02K 7/1823* (2013.01); *F01D 15/10* (2013.01); *H02K 5/225* (2013.01); *F01D 25/30* (2013.01); *F05D 2220/76* (2013.01)

(58) Field of Classification Search
CPC ........ H02K 7/1823; H02K 5/225; H02K 5/10; F05D 2220/76; F01D 25/30; F01D 15/10
See application file for complete search history.

(56) References Cited

U.S. PATENT DOCUMENTS

| 4,712,029 A | * | 12/1987 | Nold | ...................... H02K 5/225 310/71 |
| 6,628,024 B1 | * | 9/2003 | Mirmobin | .............. H02K 5/225 310/71 |
| 7,071,588 B1 | * | 7/2006 | Khazanov | .............. H02K 5/225 310/71 |

(Continued)

FOREIGN PATENT DOCUMENTS

| EP | 1811132 A1 | 7/2007 |
| EP | 3879074 A1 | 9/2021 |

OTHER PUBLICATIONS

European Search Report issued in European Application No. 24156344.4 dated Jul. 9, 2024.

*Primary Examiner* — Timothy J Thompson
*Assistant Examiner* — Rhadames Alonzo Miller
(74) *Attorney, Agent, or Firm* — CANTOR COLBURN LLP

(57) ABSTRACT

A generator assembly having: a generator; a generator case surrounding the generator and defining a case aperture; an output lead carrying power generated by the generator away from a stator of the generator; a first connector electrically connected to the output lead; an inner dielectric mount surrounding the first connector and disposed within the case aperture; an outer dielectric mount connected to the inner dielectric mount to define an overlapping portion where the outer and inner dielectric mounts overlap each other; a second connector contained in and surrounded by the outer (Continued)

dielectric mount, the outer dielectric mount configured to connect the output leads to a feeder cable via the first and second connectors; a first elastomeric moisture seal located between the inner and outer dielectric mounts at the overlapping portion; and a second elastomeric moisture seal located between the second connector and an inner surface of the outer dielectric mount.

18 Claims, 5 Drawing Sheets

(56) References Cited

U.S. PATENT DOCUMENTS

| | | | |
|---|---|---|---|
| 2007/0217905 A1* | 9/2007 | Bouiller | H02K 5/225 415/122.1 |
| 2009/0309432 A1* | 12/2009 | Bouiller | H02K 7/14 310/71 |
| 2021/0281145 A1* | 9/2021 | Lemmers, Jr. | F01D 25/243 |

* cited by examiner

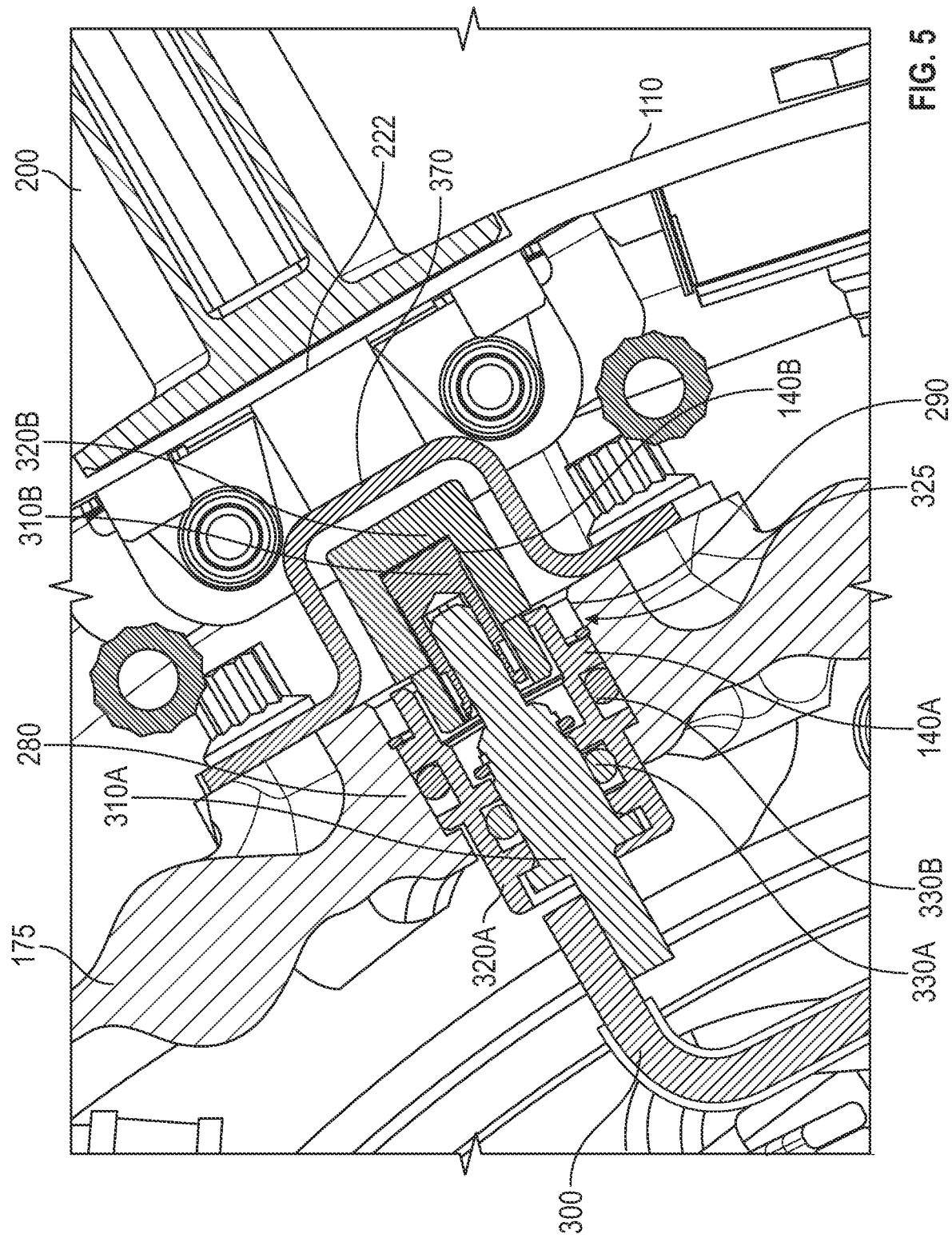

GENERATOR WITH MOISTURE SEALS

BACKGROUND

The disclosure is directed to a generator for a gas turbine engine and more specifically to a generator with moisture seals.

A gas turbine engine includes a turbine surrounded by a turbine case and an exit nozzle. Ambient air may be directed into the exhaust region of an engine, via a bypass. This may provide weather-related water saturated conditions that make the exhaust region inhospitable to sensitive electronics.

BRIEF SUMMARY

Disclosed is a generator assembly including: a generator; a generator case surrounding the generator and defining a case aperture; an output lead that carries power generated by the generator away from a stator of the generator; a first connector electrically connected to the output lead; an inner dielectric mount that surrounds the first connector and is disposed within the case aperture; an outer dielectric mount connected to the inner dielectric mount to define an overlapping portion where the outer and inner dielectric mounts overlap each other; a second connector contained in and surrounded by the outer dielectric mount, wherein the outer dielectric mount is configured to connect the output leads to a feeder cable via the first and second connectors; a first elastomeric moisture seal located between the inner and outer dielectric mounts at the overlapping portion; and a second elastomeric moisture seal located between the second connector and an inner surface of the outer dielectric mount.

In addition to one or more of the above disclosed aspects, or as an alternate, the first and second elastomeric moisture seals are elastomeric rings or boots.

In addition to one or more of the above disclosed aspects, or as an alternate, the first connector is a pin; and the second connector is a bushing.

In addition to one or more of the above disclosed aspects, or as an alternate, the inner and outer dielectric mounts are connected to each other with the case aperture.

In addition to one or more of the above disclosed aspects, or as an alternate, the generator case defines a plurality of the case apertures, circumferentially spaced apart from each other by increments of between thirty and ninety degrees, each of the case apertures includes: the first connector electrically connected to carry power from the generator; the inner dielectric mount that surrounds the first connector; the outer dielectric mount connected to the inner dielectric mount to define an overlapping portion where the outer and inner dielectric mounts overlap each other; the second connector contained in and surrounded by the outer dielectric mount, wherein the outer dielectric mount is configured to connect to one of a plurality of the feeder cables via the first and second connectors, wherein each of the inner and outer dielectric mounts within one of the case apertures defines a respective one of a plurality of dielectric mount pairs; and at least one of the dielectric mount pairs is without the elastomeric moisture seals.

In addition to one or more of the above disclosed aspects, or as an alternate, the at least one of the dielectric mount pairs without the elastomeric moisture seals is configured to face downwardly relative to gravity when the generator assembly is operating.

In addition to one or more of the above disclosed aspects, or as an alternate, the case aperture is defined by an aperture wall extending through the generator case; and the generator assembly further includes: a first oil seal between the inner dielectric mount and the first connector; and a second oil seal between the inner dielectric mount and the aperture wall.

In addition to one or more of the above disclosed aspects, or as an alternate, the oil seals are elastomers.

In addition to one or more of the above disclosed aspects, or as an alternate, the oil seals are elastomeric rings or boots.

In addition to one or more of the above disclosed aspects, or as an alternate, the generator has a forward portion and an aft portion, the forward portion defines the case aperture.

In addition to one or more of the above disclosed aspects, or as an alternate, the generator assembly further includes an insulated tail cone surrounding the generator; and a strut connected to the tail cone and extending way from the tail cone, wherein the feeder cable is supported within the strut.

In addition to one or more of the above disclosed aspects, or as an alternate, the generator assembly includes a generator input shaft; and a rotor coupled to the input shaft, the rotor including coil windings, wherein the stator surrounds the rotor and is fixed to the generator.

In addition to one or more of the above disclosed aspects, or as an alternate, the generator assembly further includes an exciter coupled to the input shaft and the coil windings.

Further disclosed is an exhaust assembly of a gas turbine engine, including: a fan exit nozzle; and a generator assembly having one or more of the above disclosed aspects disposed in the fan exit nozzle, wherein the strut extends between the tail cone and the fan exit nozzle.

Further disclosed is a gas turbine engine, including: a turbine case having an engine shaft and axial aft end; and an exhaust assembly having one or more of the above disclosed aspects connected to the aft end of the turbine case, wherein the fan exit nozzle and the generator assembly are connect to the aft end of the turbine case and the engine shaft is coupled to the generator input shaft.

BRIEF DESCRIPTION OF THE DRAWINGS

The present disclosure is illustrated by way of example and not limited in the accompanying figures in which like reference numerals indicate similar elements.

FIG. 5 is a detail identified in FIG. 4 of portion of the generator, showing the utilization of elastomeric moisture seals to prevent moisture on feeder cables, within and around struts, from reaching electrical contacts within the generator.

DETAILED DESCRIPTION

A detailed description of one or more embodiments of the disclosed apparatus and method are presented herein by way of exemplification and not limitation with reference to the Figures.

The disclosed embodiments relate to a generator 100 (FIG. 3) located in a tail cone 110 within an exit nozzle 120 of a gas turbine engine 130. The generator 100 includes first and second elastomeric moisture seals 140A, 140B (FIG. 5), utilized to prevent moisture and water from reaching electrical contacts (or other components) within the generator 100.

Figure 1:
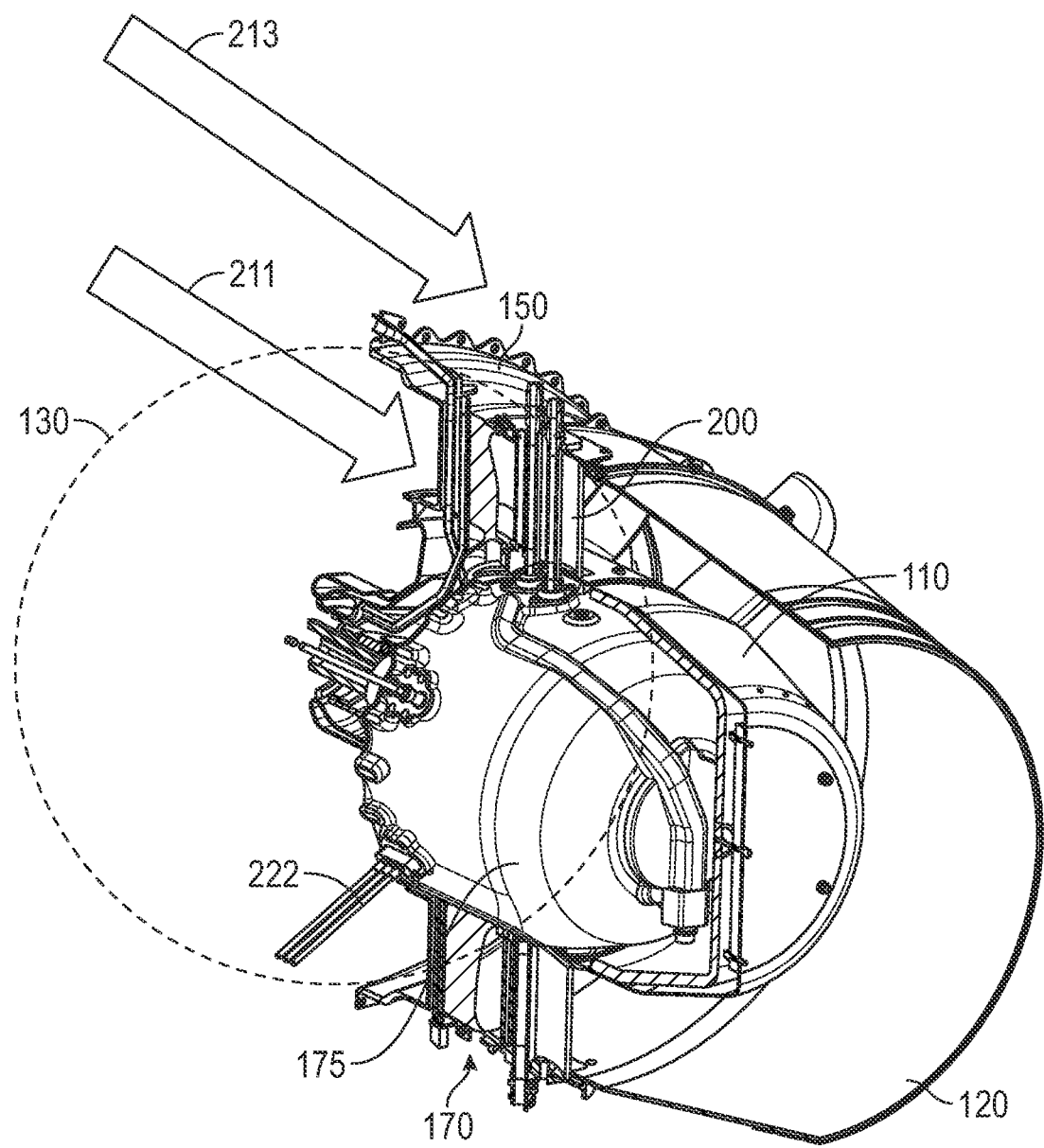
FIG. 1 is a partial sectional view of a generator according to an embodiment, where the generator is within an exit nozzle of a gas turbine engine, and the exit nozzle is connected to an aft end of a turbine case.
Figure 2:
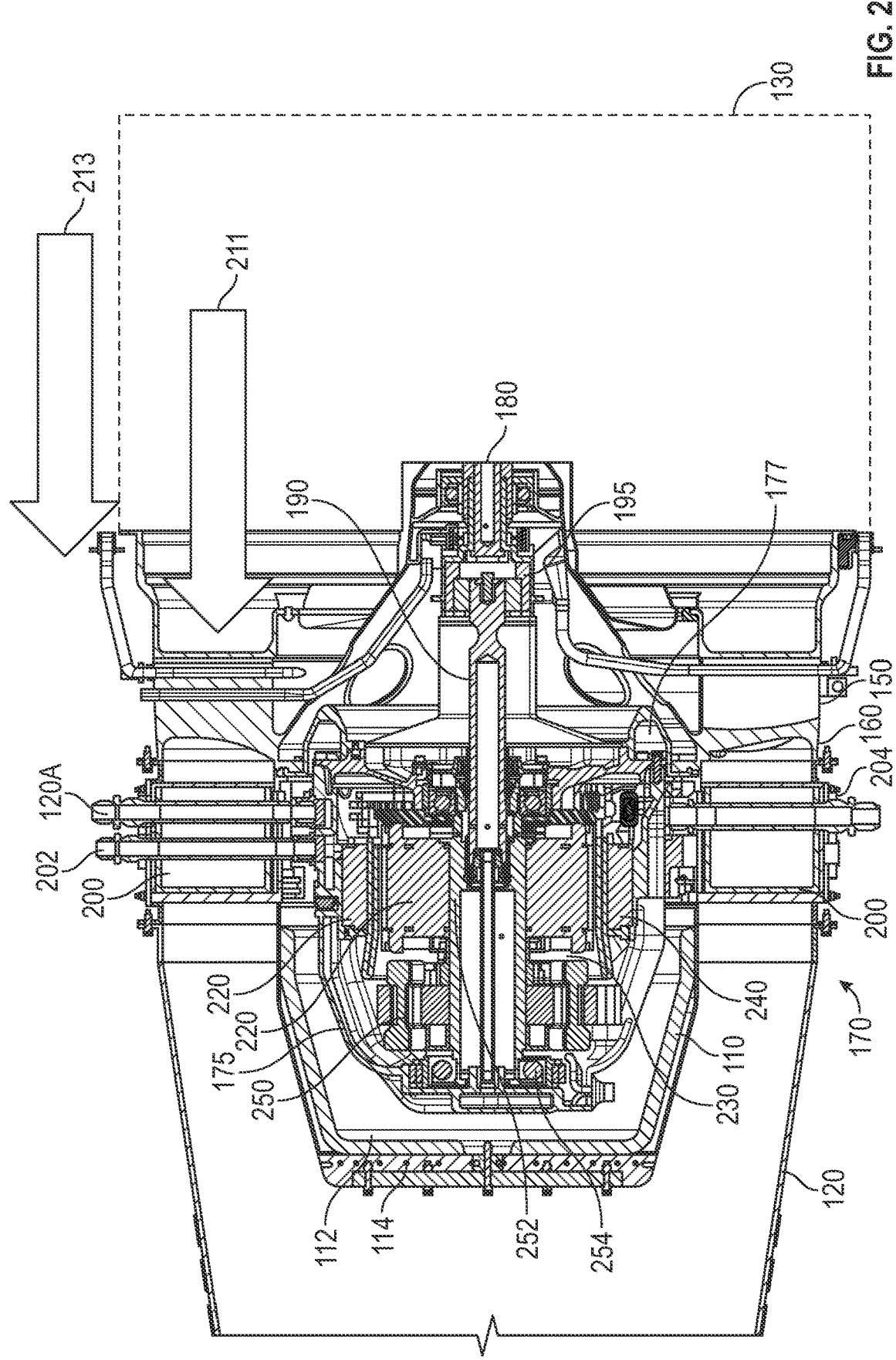
FIG. 2 is a side view of the configuration shown in FIG. 1, with additional aspects of the generator shown within the generator case.

Turning to FIGS. 1 and 2, the gas turbine engine 130 has a turbine case 150 and a fan exit nozzle 120 at its aft end 160, which may be referred to as an exhaust assembly. The engine 130 has a generator assembly 170, with a generator 100 within a generator case 175, disposed in the fan exit nozzle 120. The generator is mounted, e.g., to the aft end 160 of the turbine case 150 or the forward end 120A of the and exit nozzle 120 via a mounting flange 177. An engine shaft 180 is operationally connected to a generator input shaft 190 via a dry drive coupler 195. An insulated tail cone 110, e.g., having internal and external insulation 112, 114, surrounds the generator assembly 170. Struts 200 extend between the tail cone 110 and the fan exit nozzle 120. Oil/air lines 202 and oil scavenge lines 204 extend through the struts 200. In operation, strut 200 having the scavenge lines 104 may be directed downwardly as it extends away from the generator 100, relative to gravity. The strut 200 having the oil/air lines 202 may be direct upwardly as it extends away from the generator 100. Feeder cables 222 extend through the struts 200 to the generator 100.

FIGS. 1 and 2 show the flow path of hot engine core air 211 at over twelve hundred degrees Fahrenheit and cool bypass air 213 at under three hundred degrees Fahrenheit flowing through the engine, inside and outside of the engine nozzle 120. This temperature difference between these flows, along with moisture carried by the bypass air 213, may result in moisture pooling around and within the struts 200. This moisture may travel down the feeder cables 222, e.g., by gravity, into the generator 100 and cause shorts, rust, and other resulting damage to the generator. As indicated above and disclosed in greater detail below, the first and second elastomeric moisture seals 140A, 140B (FIG. 5) are utilized to prevent moisture and water from reaching electrical contacts within the generator 100.

Figure 3:
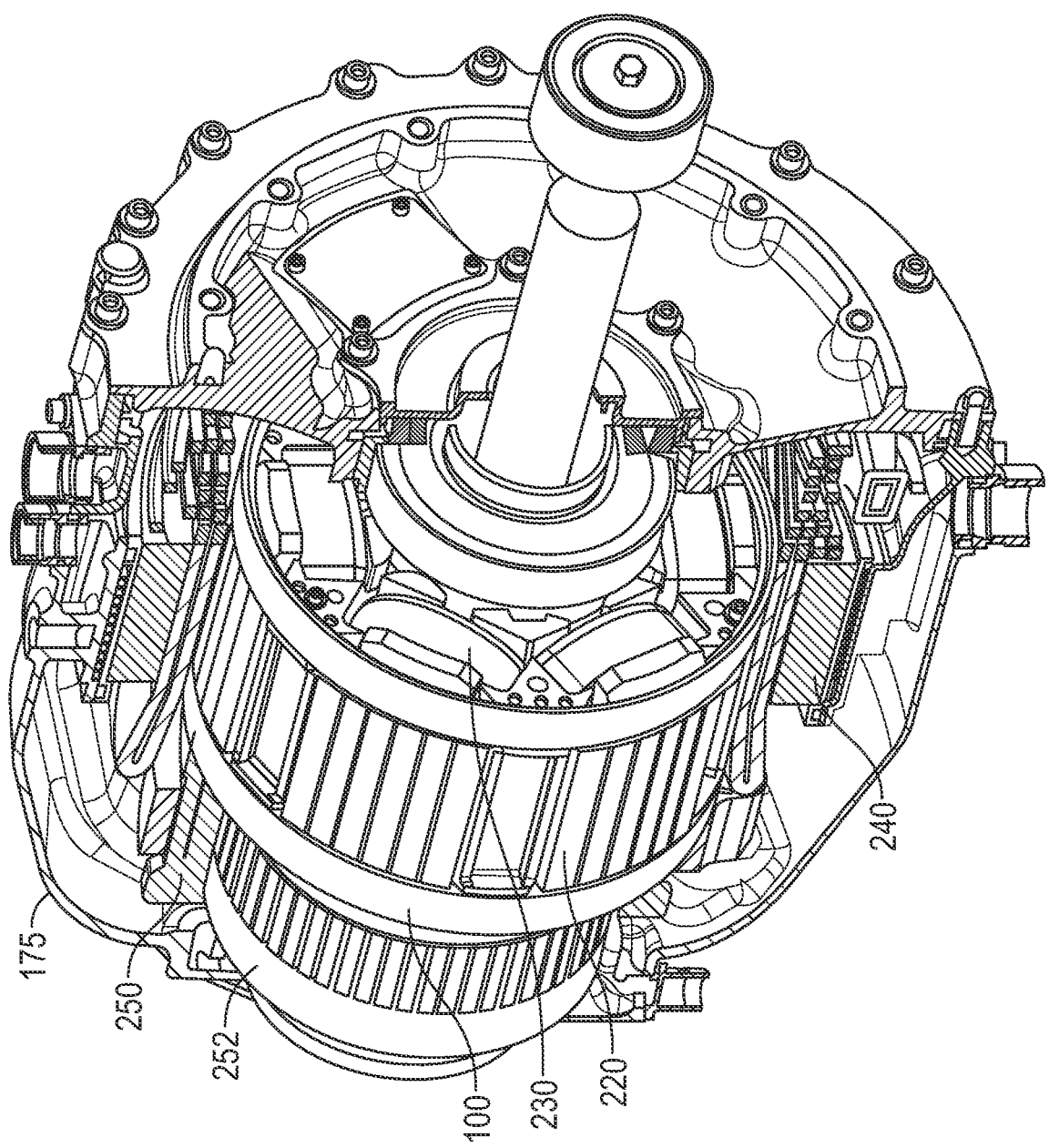
FIG. 3 is a perspective view of the generator within the generator case, the rest of the engine is not shown.

With reference to FIGS. 2 and 3, a rotor 220 in the case 175 of the generator 100 is coupled to the generator input shaft 190. The rotor 220 includes coil windings 230. A stator 240 surrounds the rotor 220. An exciter 250 is coupled to the input shaft 190 and the coil windings 230. The generator 100 also has a rotor balance assembly 252 and rotor bearings 254.

Figure 4:
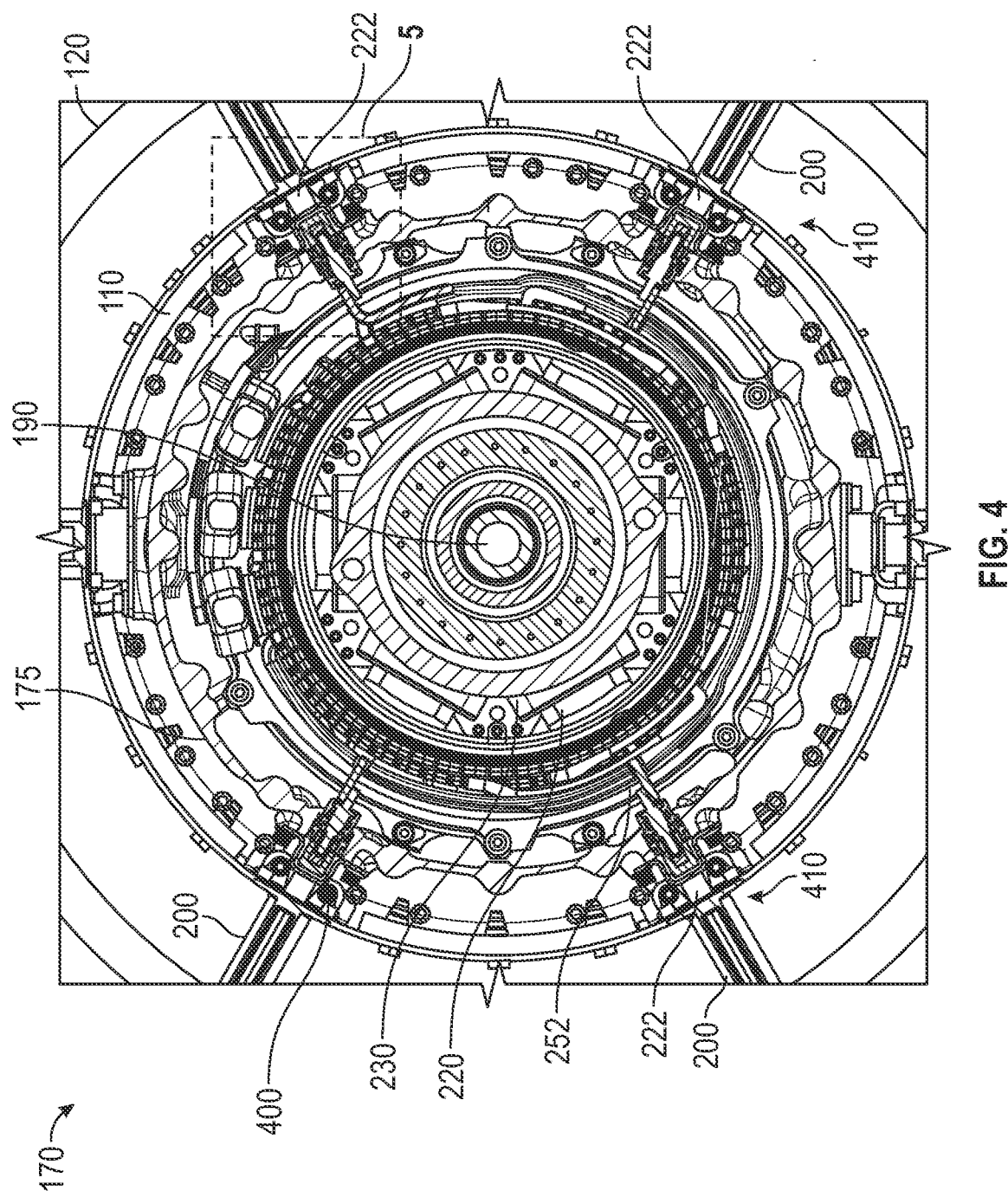
FIG. 4 is a front view of the generator within the exit nozzle.

Turning to FIG. 4, additional features of the generator assembly 170 are shown. For reference, in FIG. 4 the input shaft 190, struts 200, generator case 175, tail cone 110, exit nozzle 120, rotor 220, and windings 230, rotor balance assembly 252 and feeder cables 222 are shown.

As shown in FIG. 5, the generator case 175 defines case apertures 280. More specifically, the case apertures 280 are defined by aperture walls 290 extending through the generator case 175. The oil/air lines, scavenge lines and the feeder cables 222 are operationally coupled to the generator via the case apertures 280.

The generator 100 includes output leads 300 that carry power generated by the generator 100 away from the stator 240. A first connector 310A is electrically connected to the output leads 300. The first connector 310A is a pin in one embodiment. An inner dielectric mount 320A surrounds the first connector 310A. The inner dielectric mount 320A is disposed within the case aperture 280. A first oil seal 330A is between the inner dielectric mount 320A and the first connector 310A. A second oil seal 330B is between the inner dielectric mount 320A and the aperture wall 290. The oil seals 330A, 330B are elastomers, and specifically rings or boots.

An outer dielectric mount 320B is connected to the inner dielectric mount 320A within the case aperture 280 to define an overlapping portion 325 where the inner and outer dielectric mounts 320A, 320B overlap each other, with the inner mount 320A being exterior to the outer mount 320B at the overlapping portion 325. The outer dielectric mount 320B surrounds a second connector 310B. The second connector 310B is a female connector and may be a conductive bushing. The outer dielectric mount 320B is configured to connect the output leads to a feeder cable 222 via the first and second connectors 310A, 310B. The feeder cable 222 is supported within the strut 200 and extends between the generator 100 and the fan exit nozzle 120 (FIG. 4). A harness bracket 370 secures the outer dielectric mount 320B to the generator case 175 at the case aperture 280.

The first elastomeric moisture seal 140A is located between the inner and outer dielectric mounts 320A, 320B at the overlapping potion 325. The second elastomeric moisture seal 140B is located between the second connector 310B and the outer dielectric mount 320B. The first and second elastomeric moisture seals 140A, 140B are elastomeric rings or boots that prevent moisture from pasting therethrough.

As shown in FIG. 4, the generator 100 may have a plurality of the case apertures 280, circumferentially spaced apart from each other by increments of between thirty and ninety degrees. As with the configuration of FIG. 5, each of the case apertures 280 may include the first connector 310A electrically connected to the generator to draw power from it. The inner dielectric mount 320A may surrounds the first connector 310A. The second connector 310B may be contained in and surrounded by the outer dielectric mount 320B. The outer dielectric mount 320B may be configured to one of a plurality of feeder cables 222. Each of the inner and outer dielectric mounts 320A, 320B within one of the case apertures 280 may define a respective one of a plurality of dielectric mount pairs 400 that define an overlapping portion 325.

According to an embodiment, at least one pair 410 of the dielectric mount pairs 400, is without the elastomeric moisture seals 140A, 140B. Specifically, the at least one pair 410 of the dielectric mount pairs 400 without the elastomeric moisture seals 140 faces downwardly relative to gravity when the generator assembly 170 is operating. For these dielectric mount pairs 410, the struts 200 are angled downwardly and gravity draws moisture from the struts 200 and feeder cables 222 away from the generator 100 that would otherwise flow toward the generator 100. Thus, the moisture seals 140A, 140B are not needed for the downwardly facing mount pairs 410. However, including them is optional and does not depart from the teachings herein.

The above configuration provides moisture seals 140A, 140B that prevent moisture from reaching the electrical connectors 310A, 310B and traveling into the generator 100, which could otherwise cause shorts, rust and other damage within the generator 100 located in the tail cone 110 of a gas turbine engine 130. The configuration prolongs the useful life of the generator 100 and enhances its reliability.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A generator assembly comprising:
a generator;
a generator case surrounding the generator and defining a plurality of case apertures circumferentially spaced apart from each other;
an output lead that carries power generated by the generator away from a stator of the generator;
and wherein each of the plurality of case apertures comprises:
a first connector electrically connected to the output lead;
an inner dielectric mount that surrounds the first connector and is disposed within the case aperture;
an outer dielectric mount connected to the inner dielectric mount to define an overlapping portion where the outer and inner dielectric mounts overlap each other;
a second connector contained in and surrounded by the outer dielectric mount, wherein the outer dielectric mount is configured to connect the output leads to one of a plurality of feeder cables via the first and second connectors;
wherein each of the inner and outer dielectric mounts within one of the case apertures defines a respective one of a plurality of dielectric mount pairs; and wherein at least one of the dielectric mount pairs comprises:
a first elastomeric moisture seal located between the inner and outer dielectric mounts at the overlapping portion; and
a second elastomeric moisture seal located between the second connector and an inner surface of the outer dielectric mount.

2. The generator assembly of claim 1, wherein:
the first and second elastomeric moisture seals are elastomeric rings or boots.

3. The generator assembly of claim 2, wherein:
the first connector is a pin; and
the second connector is a bushing.

4. The generator assembly of claim 3, wherein:
the inner and outer dielectric mounts are connected to each other with the case aperture.

5. The generator assembly of claim 4, wherein:
the plurality of the case apertures, are circumferentially spaced apart from each other by increments of between thirty and ninety degrees; and
at least one of the dielectric mount pairs is without the elastomeric moisture seals.

6. The generator assembly of claim 5, wherein:
the at least one of the dielectric mount pairs without the elastomeric moisture seals is configured to face downwardly relative to gravity when the generator assembly is operating.

7. The generator assembly of claim 4, wherein:
each case aperture is defined by an aperture wall extending through the generator case; and
the generator assembly further comprises:
a first oil seal between the inner dielectric mount and the first connector; and
a second oil seal between the inner dielectric mount and the aperture wall.

8. The generator assembly of claim 7, wherein:
the oil seals are elastomers.

9. The generator assembly of claim 8, wherein:
the oil seals are elastomeric rings or boots.

10. The generator assembly of claim 9, wherein:
the generator has a forward portion and an aft portion, the forward portion defines a case aperture.

11. The generator assembly of claim 10, further comprising:
an insulated tail cone surrounding the generator; and
a strut connected to the tail cone and extending way from the tail cone, wherein the feeder cable is supported within the strut.

12. The generator assembly of claim 11, further comprising:
a generator input shaft; and
a rotor coupled to the input shaft, the rotor including coil windings, wherein the stator surrounds the rotor and is fixed to the generator.

13. The generator assembly of claim 12, further comprising:
an exciter coupled to the input shaft and the coil windings.

14. An exhaust assembly of a gas turbine engine, comprising:
a fan exit nozzle; and
the generator assembly of claim 13 disposed in the fan exit nozzle, wherein the strut extends between the tail cone and the fan exit nozzle.

15. A gas turbine engine, comprising:
a turbine case having an engine shaft and axial aft end; and
the exhaust assembly of claim 14 connected to the aft end of the turbine case,
wherein the fan exit nozzle and the generator assembly are connect to the aft end of the turbine case and the engine shaft is coupled to the generator input shaft.

16. The generator assembly of claim 1, wherein:
at least one of the dielectric mount pairs is without the elastomeric moisture seals.

17. The generator assembly of claim 16, wherein:
the plurality of the case apertures are circumferentially spaced apart from each other by increments of between thirty and ninety degrees.

18. The generator assembly of claim 5, wherein:
at least one of the dielectric mount pairs is without the elastomeric moisture seals.

* * * * *